(No Model.) 2 Sheets—Sheet 1.

A. MORRIS.
APPARATUS FOR MAKING FERTILIZERS.

No. 591,987. Patented Oct. 19, 1897.

Witnesses
F. S. Belt.
R. M. Elliott

Inventor
Albert Morris
by J. Krebs Rust Jr.
his Attorney

THE NORRIS PETERS CO., PHOTO-LITHO., WASHINGTON, D. C.

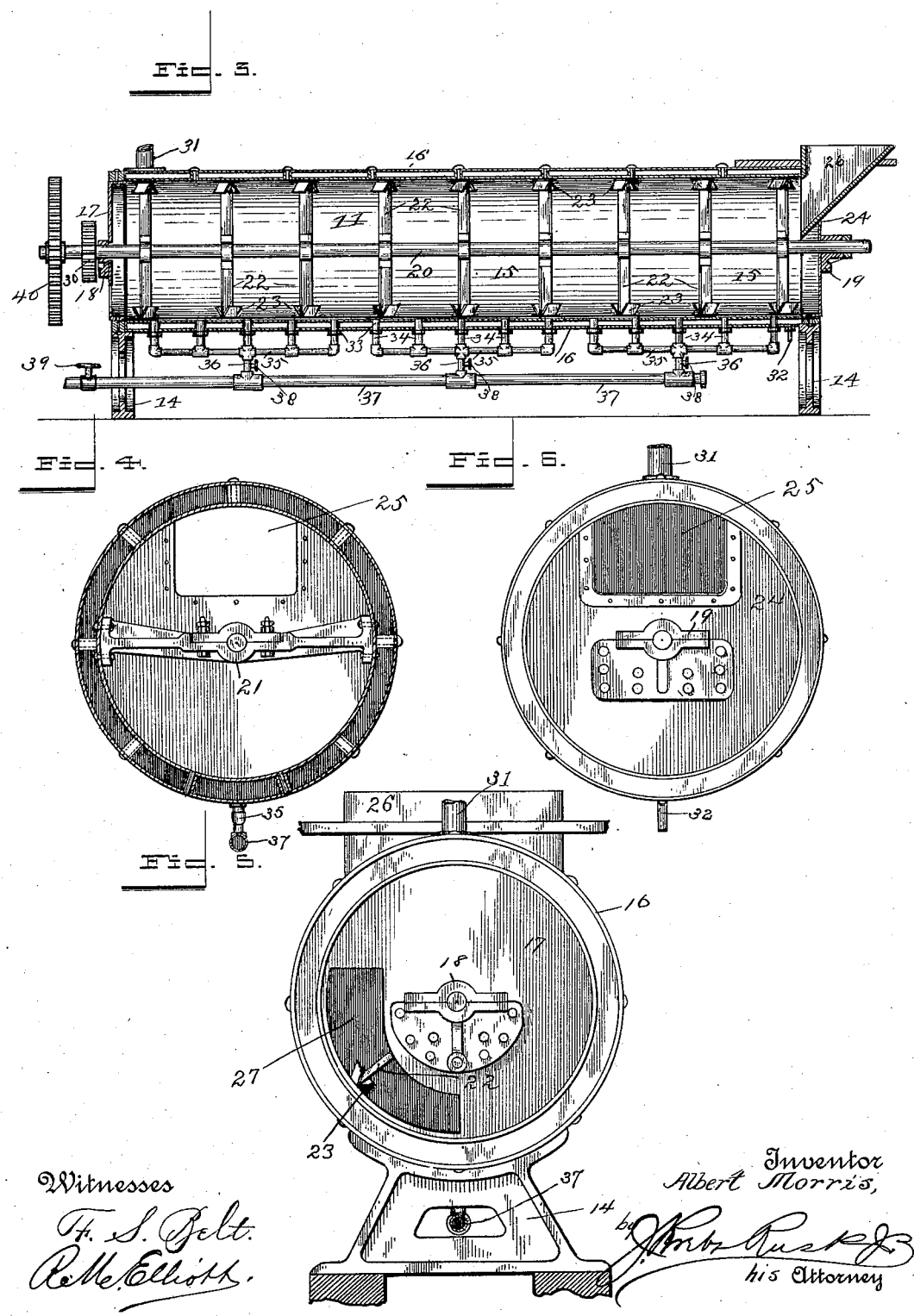

UNITED STATES PATENT OFFICE.

ALBERT MORRIS, OF FAIR PORT, VIRGINIA.

APPARATUS FOR MAKING FERTILIZERS.

SPECIFICATION forming part of Letters Patent No. 591,987, dated October 19, 1897.

Application filed August 12, 1896. Serial No. 602,553. (No model.)

*To all whom it may concern:*

Be it known that I, ALBERT MORRIS, a citizen of the United States, residing at Fair Port, in the county of Northumberland, Virginia, have invented a certain new and useful Improvement in Apparatus for Drying Fish to Produce Fertilizers, as will appear hereinafter in the specification hereunto annexed.

My invention has relation to an apparatus for the manufacture of fertilizer from fish, and my object is to provide a device of this character which will be cheap to manufacture and durable in use.

Heretofore in the manufacture of fertilizer from fish, it has been customary to cook the fish in vats or tanks by means of boiling water. This operation took from one and one-half to three hours, or longer, according to the condition of the fish, while the odor given off from the cooking mass was extremely offensive and could be noticed for miles. A great objection to this process of cooking the fish was that a large percentage of ammonia, the active principle of all fertilizers, was lost, due to the open vats which readily allowed it to escape into the atmosphere as soon as it was liberated from the cooking mass. After the fish were cooked they were then pressed, and the water and oil exuded was collected to be used for commercial purposes, while the residue or "fish-scrap" was spread on platforms in the sun and allowed to dry. This drying process took from twelve hours to three or four days, according to the condition of the weather, and during the drying of the fish-scrap more of the essential element of the fertilizer, namely, ammonia, was lost, while the stench was unbearable. Further than this the fertilizer produced was coarse and could not be readily handled and worked into the soil. Owing to the length of time required to produce the fertilizer and the poor facilities for the handling of the stock, a great amount of the same was wasted and rotted either in the sun or rain before it could be cooked, thereby adding to the nauseating odor, particularly in rainy weather and at the same time adding greatly to the cost of manufacture, owing to this loss of stock.

By my improved apparatus all the objectionable features hereinbefore referred to are overcome and a fertilizer is produced in from one-half to two hours, with hardly any odor present during manufacture and far richer, as chemical tests have shown, than fertilizers made in the manner heretofore described.

Figure 1:
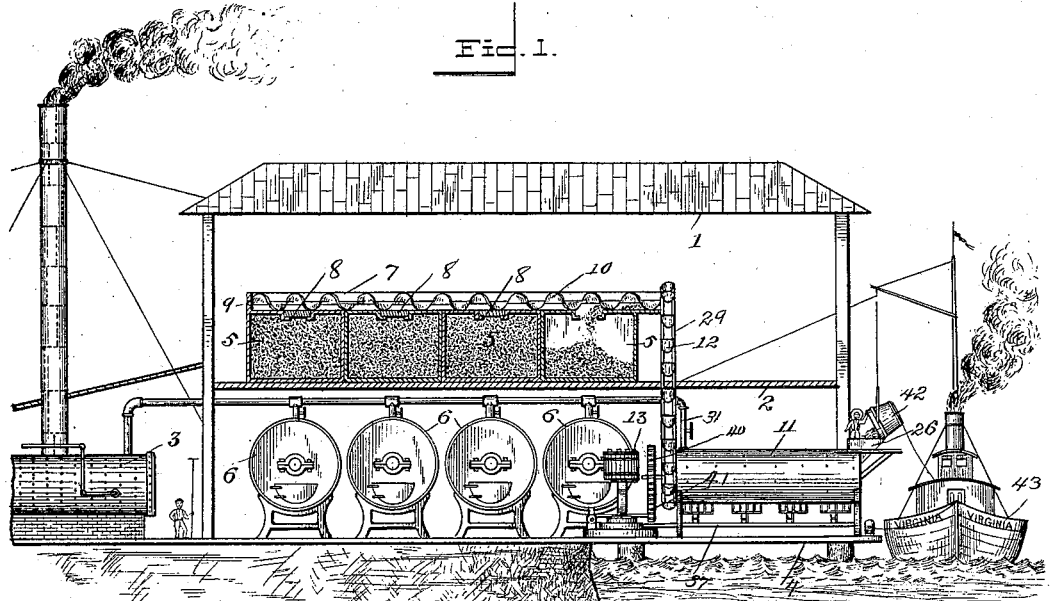
Figure 2:
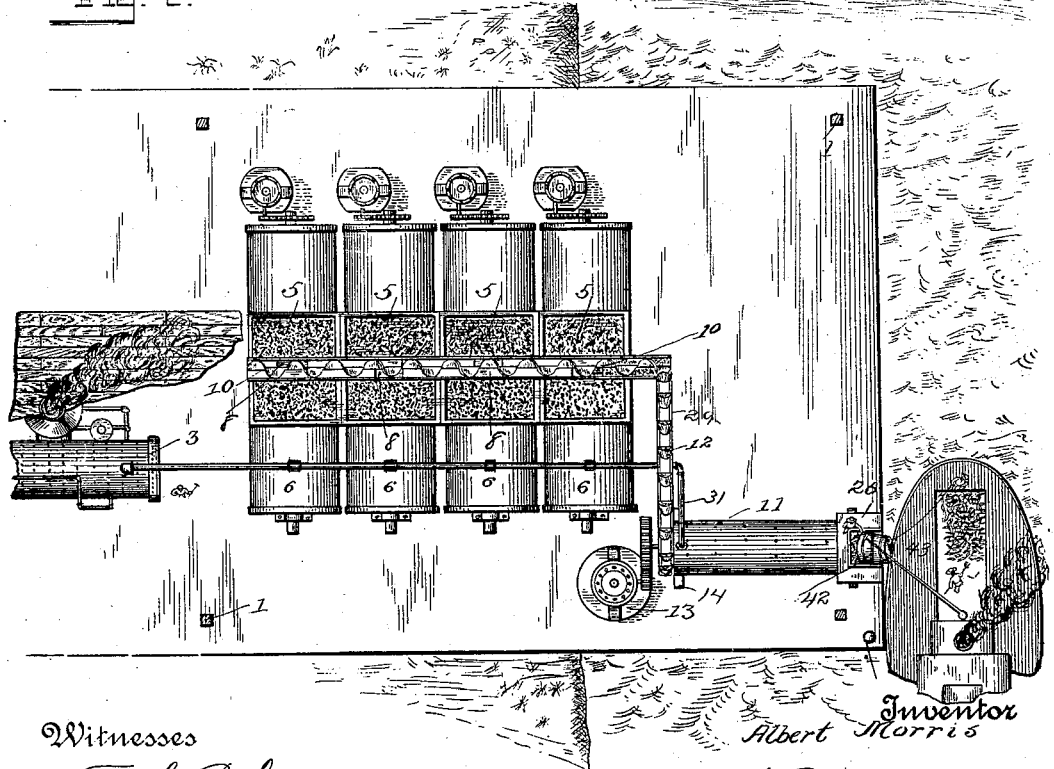

In the accompanying drawings, Figure 1 is an elevation of a plant for the conversion of fish into fertilizer. Fig. 2 is a plan view thereof with the roof of the plant removed. Fig. 3 is a sectional view of the cooking apparatus. Fig. 4 is a cross-sectional view of the cooking apparatus, and Fig. 5 is an end view of the cooker. Fig. 6 is an elevation showing the end opposite to that shown in Fig. 5 with the hopper removed.

Referring to the drawings, 1 indicates a shed or building of any desired construction, divided into two compartments by a flooring 2. An engine and boiler are represented at 3 for the purpose of furnishing power to the plant. In practice I prefer to locate my plant on a river or bay and for a purpose to be hereinafter described I provide a wharf 4, as shown in Fig. 1.

Arranged suitably on the flooring 2 are a series of fish-vats 5 5 5, while located beneath the said vats are a series of fish-driers 6 6 6. Located above the vats is a distributer or way 7, provided with sliding doors 8, located in its bottom, as shown. Bearings 9 9, located at each end of the way 7, serve to support the end of a worm-screw 10, the purpose of which will be alluded to later.

A fish-cooker 11 is located near the wharf 4, and as the fish are cooked they are taken up by the elevator-buckets 12 of the conveyer from the end of the cooker 11 and carried to the distributer 7, where they are dumped.

An engine 13, operated by steam from the boiler-house, serves to drive the buckets.

The fish-cooker 11 is mounted on the supports 14, and consists of a fish-receptacle 15, having an outer air-tight casing 16, appropriately secured thereto. Heads 17 and 24 are secured at each end of the casing and are provided with bearings 18 and 19 for the shaft 20, which runs through the fish-cooker. An additional bearing 21 is located centrally of the shafting and serves to give additional support to the line of shafting. Secured at suitable intervals on the shaft 20 are a number of stirrer-arms 22, provided with angular shoes 23.

At the upper portion of the head 24 is a charge-opening 25, to which is secured the fish-hopper 26, while in the lower portion of head 17 a segmental piece 27 is removed therefrom, as shown plainly in Fig. 5, and serves as the discharge-port, from which the cooked fish pass to the elevator or conveyer-buckets 12, which are secured in the usual way to an endless chain 29, which passes over a sprocket-wheel 30. Steam is admitted between the outer and the inner casing of the cooker by means of the steam-pipe 31, while the condensed steam is allowed to escape by means of a drip-pipe 32, located at one end of the casing. A series of thimbles 33 are secured at their ends to the inner and outer casing and are adapted to be connected to branch supply-pipes 34 on the branch steam-supply pipe 35, which is connected in a suitable manner by pipe 36 to the main steam-supply pipe 37. Cocks 38, situated on pipe 36, serve to limit or cut off entirely the supply of steam to the supply-pipes, while the main steam-supply pipe is provided with a cock 39, which controls all the steam-supply to the cooker. A gear-wheel 40, secured on the end of the shaft, is driven by a spur-wheel 41 and serves to give motion to the stirrer shaft and arms.

When it is desired to use the cooker, the steam is admitted between the casings through the steam-pipe 31. The cock 39 is opened, thereby allowing steam to pass through the supply-pipe, branch supply-pipes, and thimbles into the inner casing. The engine 13 is then started, revolving the spur-wheel 41 and the gear-wheel 40, which in turn revolves the shafting and the stirrers mounted thereon. The fish are hauled in buckets 42 from the hold of the vessel 43 and are deposited in the hopper 26.

As soon as the fish enter the cooker through the hopper they are acted upon by the steam and are almost instantaneously cooked, while the shoes on the stirrer-arms continually agitate the mass and force it toward the discharge-port, where it is received by the conveyers and carried to the distributer or way 7. This cooking operation requires ninety seconds and is continuous, the fish passing right through as they are deposited in the hopper, and out into the conveyer-buckets.

When it is desired to fill any particular vat, the sliding door or gate 8, in the distributing-way 7, over the vat to be filled is opened and the worm-screw, which is being revolved by the sprocket-chain attached to the conveyer-buckets, carries the cooked fish along the way to the opening therein and the fish in the distributer fall by gravity into the vat until the same is filled, when the door is closed and another one opened over another vat until each vat is filled. When it is desired to fill a vat not directly beneath the opening or door in the distributer, a chute is attached to the distributer beneath one of the doors and the vat filled in this manner.

After the vats have been filled the cooked fish are removed therefrom and by means of a hydraulic press (not shown) the oil and water are expressed, after which the fish-scrap is then placed in the driers and dried, after which it is ready for use as a fertilizer.

Having described my invention, what I claim as new, and desire to secure by Letters Patent, is—

In an apparatus for making fertilizer, the combination of the closed receptacle for cooking the material to be treated, stirrers mounted in said receptacle for agitating the material while cooking, a series of closed tanks provided with doors for storing the cooked material out of contact with the air, a distributer passing over said tanks and having openings in its bottom registering with the doors of said tanks, means for closing said openings, and a conveyer leading from the cooker to the distributer.

In testimony whereof I hereunto affix my name in the presence of two witnesses.

ALBERT MORRIS.

Attest:
  HUGH RIDGELY RILEY,
  WM. H. JONES.